(12) United States Patent
Tsui et al.

(10) Patent No.: US 9,356,918 B2
(45) Date of Patent: May 31, 2016

(54) IDENTIFICATION DELEGATION FOR DEVICES

(71) Applicant: GOOGLE INC., Mountain View, CA (US)

(72) Inventors: Francis Tsui, Mountain View, CA (US); Majd Bakar, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/801,143

(22) Filed: Mar. 13, 2013

(65) Prior Publication Data

US 2014/0282882 A1    Sep. 18, 2014

(51) Int. Cl.
*H04L 29/06* (2006.01)
*G06F 21/10* (2013.01)

(52) U.S. Cl.
CPC .............. *H04L 63/08* (2013.01); *G06F 21/10* (2013.01)

(58) Field of Classification Search
CPC ....... G06Q 20/00; G06Q 40/00; G06Q 30/00; H04L 63/08; H04L 29/06; G06F 21/10
USPC .......................................................... 726/4
See application file for complete search history.

(56) References Cited

U.S. PATENT DOCUMENTS

| | | | |
|---|---|---|---|
| 7,653,073 B2 * | 1/2010 | Dowker | 370/401 |
| 7,996,514 B2 | 8/2011 | Baumert et al. | |
| 8,085,936 B2 * | 12/2011 | Peel et al. | 380/277 |
| 8,107,629 B2 * | 1/2012 | Ryu et al. | 380/272 |
| 8,214,853 B2 | 7/2012 | Dasher et al. | |
| 8,316,400 B1 | 11/2012 | Kravets | |
| 2006/0259927 A1 | 11/2006 | Acharya et al. | |
| 2008/0181154 A1 | 7/2008 | Sherman | |
| 2010/0027465 A1 * | 2/2010 | Ylitalo et al. | 370/328 |
| 2010/0199341 A1 | 8/2010 | Foti et al. | |
| 2010/0248843 A1 * | 9/2010 | Karsten | 463/43 |
| 2010/0274859 A1 | 10/2010 | Bucuk | |

(Continued)

FOREIGN PATENT DOCUMENTS

WO    2008113827 A2    9/2008

OTHER PUBLICATIONS

"Set up the Netflix App", Netflix on Xbox LIVE, retrieved on Feb. 11, 2013 from support.xbox.com/en-US/apps/netflix/netflix-setup, 2 pages.

(Continued)

*Primary Examiner* — Chau Le
*Assistant Examiner* — Muhammad Chaudhry
(74) *Attorney, Agent, or Firm* — Brake Hughes Bellermann LLP

(57) ABSTRACT

A first communication session is conducted between a media device and a mobile device. The first communication session includes requesting an authorization code from the mobile device and receiving the authorization code from the mobile device. The mobile device acts as an intermediary for obtaining authentication from a content server. The mobile device initiates a second communication session with a provider authorization service of the content server. The second communication session includes obtaining a token from the provider authorization service using the authorization code. The media device initiates a third communication session with the content server. The third communication session includes utilizing the token to obtain content from the content server. The system automatically attempts to renew the token in response to an expiration of the token.

14 Claims, 7 Drawing Sheets

(56) References Cited

U.S. PATENT DOCUMENTS

| | | | |
|---|---|---|---|
| 2010/0293379 A1* | 11/2010 | Nie | 713/169 |
| 2011/0067075 A1 | 3/2011 | Barry | |
| 2011/0320819 A1 | 12/2011 | Weber et al. | |
| 2012/0003965 A1 | 1/2012 | Eisinger et al. | |
| 2012/0159338 A1 | 6/2012 | Mountanos et al. | |
| 2012/0223883 A1* | 9/2012 | Solomon | G06F 3/0317 345/157 |
| 2013/0007846 A1* | 1/2013 | Murakami et al. | 726/4 |
| 2014/0026193 A1* | 1/2014 | Saxman et al. | 726/4 |
| 2014/0096220 A1* | 4/2014 | Da Cruz Pinto | G06F 21/00 726/9 |
| 2014/0165147 A1* | 6/2014 | Hershberg | H04L 63/083 726/4 |
| 2014/0253740 A1* | 9/2014 | Barnwal et al. | 348/207.1 |
| 2015/0215770 A1* | 7/2015 | Chan | H04W 12/04 455/456.1 |

OTHER PUBLICATIONS

"Meet Roku", retrieved on Feb. 20, 2013 from www.roku.com/meet-roku, 3 pages.

"Meet Boxee TV", Boxee, Inc., retrieved on Feb. 20, 2013 from www.boxee.tv/#/features, 36 pages.

International Search Report and Written Opinion for PCT Application No. PCT/US2014/019066, mailed May 20, 2014, 8 pages.

* cited by examiner

IDENTIFICATION DELEGATION FOR DEVICES

TECHNICAL FIELD

This disclosure generally relates to interactions between a media player and a mobile device.

BACKGROUND

When content provider applications are running on a media player or other device, the content provider applications need to use the right user credentials to ensure access and rights are enforced properly, and in the case of impression-powered playback, that the right impressions are counted against the right user.

In second screen based interactions, a first screen is used to playback content, while the second screen is used to discover and control that content. One issue with many second screen based interaction experiences is that there is an explicit pairing between the controlling device on the second screen and the first screen player, to force the use of the same identity on both the first and second devices, such as a controller and a player device. This situation presents a user with a limited and cumbersome experience where the user has to deal with a pairing operation that usually involves yet another device, such as entering a pairing code on a computer with a separate web browser, or requires the use of another peripheral device to enter the exact same credentials on both devices. This also limits the user experience in the sense that only the provisioned account can be used on the first screen regardless of whose second screen device is being used, making a social aspect of controlling a television and sharing videos a complex process.

SUMMARY

A first device such as a television and a mobile device communicate. The mobile device acts as an intermediary for obtaining authentication from a content server. The first device uses the authentication to output the content (e.g., movies) from the content server. When the authentication expires, for example if a user of the mobile device moves the mobile device out of range, the system may attempt to renew the authentication, and if that renewal attempt fails, the system may terminate access to the content.

In one general aspect, a first communication session is conducted between a media device and a mobile device. The first communication session includes requesting an authorization code from the mobile device and receiving the authorization code from the mobile device. The mobile device acts as an intermediary for obtaining authentication from a content server. The mobile device initiates a second communication session with a provider authorization service of the content server. The second communication session includes obtaining a token from the provider authorization service using the authorization code. The media device initiates a third communication session with the content server. The third communication session includes utilizing the token to obtain content from the content server. The system automatically attempts to renew the token in response to an expiration of the token.

Other implementations of this aspect include corresponding systems, apparatus, and computer programs, configured to perform the actions of the methods, encoded on computer storage devices.

In another general aspect, a system includes means for conducting a first communication session between a media device and a mobile device, the first communication session including requesting an authorization code from the mobile device and receiving the authorization code from the mobile device, the mobile device acting as an intermediary for obtaining authentication from a content server. The system includes means for initiating a second communication session with a provider authorization service of the content server, the second communication session including obtaining a token from the provider authorization service using the authorization code. The system includes means for initiating a third communication session with the content server, the third communication session including utilizing the token to obtain content from the content server. The system includes means for automatically attempting to renew the token in response to an expiration of the token.

One or more of the implementations of the subject matter described herein may provide one or more of the following advantages. The user may not need to explicitly perform any binding or registration action to enforce the use of credentials on both sides of the interaction, and the user's normal flow is not interrupted. Further, ad-hoc identity pairing allows for multiple users to delegate their identities to a device without going through a complex unpairing and pairing process, and in some cases allows for multiple identities to be used at the same time. The development of a device application is simpler where no complex authentication logic is required. There is a specific authorization or purchase flow that may be followed for each session, which is all possible on a mobile device. Interactions can take place easily on the user interface of the mobile device, for example in cases where a media player does not have an easily accessible user interface for receiving login or other input.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
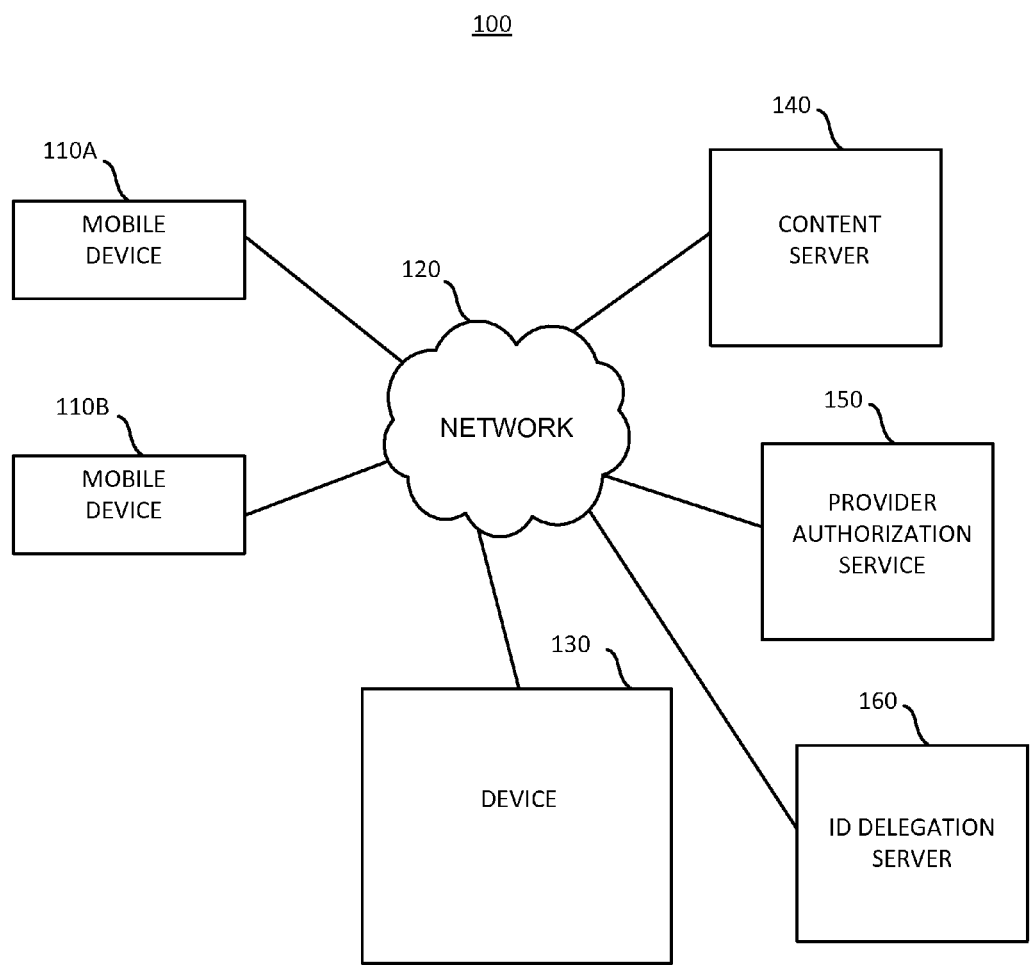
FIG. 1 is a block diagram of a system that can be used to provide identification delegation.

FIG. 1 is a block diagram of a system that can be used to provide identification delegation. System 100 may include mobile devices 110A and 110B, a device 130, a content server 140, and a provider authorization service 150, which are interconnected through at least one network 120.

Mobile device 110A or 110B may be a computer, a smart phone, a laptop, or a similar device that may execute a user interface, download and execute software applications, and communicate with a device 130, a content server 140, and a provider authorization service 150. Various examples of mobile devices are described in more detail below with respect to FIG. 7. The network 120 may be a single network or a combination of any type of computer network, such as a Local Area Network (LAN) or a Wide Area Network (WAN), a WIFI network, a BLUETOOTH network, or other network. In addition, network 120 may be a combination of public (e.g., Internet) and private networks.

Device 130 is a computing device such as a television or other media player such as a speaker. The computing device may in various implementations include a display screen, but in some implementations, device 130 may not include a graphical user interface (e.g., display area) or other user interface input features, or text user input (e.g., the device 130 may be a speaker to play music). Device 130 may execute software and communicate with mobile devices 110A, 110B, content server 140, provider authorization service 150, and ID delegation server 160. Various examples of devices are described in more detail with respect to FIG. 7. The content server 140 is a computer or a similar device that communicates with mobile devices 110A and 110B and device 130 to provide content such as audio or visual content, including movies, music, photographs, or other data or information over network 120. As illustrative examples only, content server 140 may provide streaming music via network 120, using a service such as PANDORA, or may provide streaming videos using a service such as NETFLIX. The provider authorization service 150 may be a computer that provides identification validation services for content server 140.

In the arrangement shown in FIG. 1, device 130, which may be a television, speaker, or other media player, may in some implementations optionally identify itself to the provider authorization service 150, for example by providing IP addresses, signals, or other information. Similarly, the mobile device 110A or 110B may also identify itself to the provider authorization service 150.

Device 130 may periodically or continuously broadcast various identification signals over network 120, as described in more detail below with respect to FIG. 2. In some implementations, mobile devices 110A and 110B may detect the signals, for example when they come within a predetermined range of device 130. In some implementations, mobile devices 110A and 110B may receive information from ID delegation server 160 about device 130 (e.g., location data). In response to a request for authorization, mobile devices 110A and 110B may provide authorization, for example using provider authorization service 150, to device 130 in order for device 130 to use a user's account (e.g., a PANDORA account) that is associated with the mobile device. The device 130 may utilize the user account to obtain or provide data, for example to play music from a service (e.g., PANDORA) via device 130. The data may be provided by one or more servers that may request authentication credentials of a user, such as content server 140. In some implementations, a mobile device may provide authorization to device 130 based on user input to the mobile device.

It will be appreciated that any number of alternative or additional servers, services, mobile devices, or devices may be included in system 100. The use of two mobile devices 110A and 110B, one device 130, one content server 140, and one provider authorization service 150, is merely for illustration. As another example, in some implementations, content server 140 and provider authorization service 150 may be combined in a single computer or server, or may be directly connected to each other.

As an example, the system shown in FIG. 1 may allow Andy to use his smartphone or laptop to access video or music accounts to play movies or music on his friend Bob's television at Bob's house. In one example, if Andy uses his phone to help Andy and Bob watch a movie with Bob at Bob's house, but then Andy leaves the house and takes his phone with him, the system shown in FIG. 1 may determine that Andy's phone is no longer accessing Bob's television, and thus may terminate the movie session so that unauthorized users (other people in Bob's house, for example) can no longer have access to Andy's account to watch movies using Andy's account.

Figure 2:
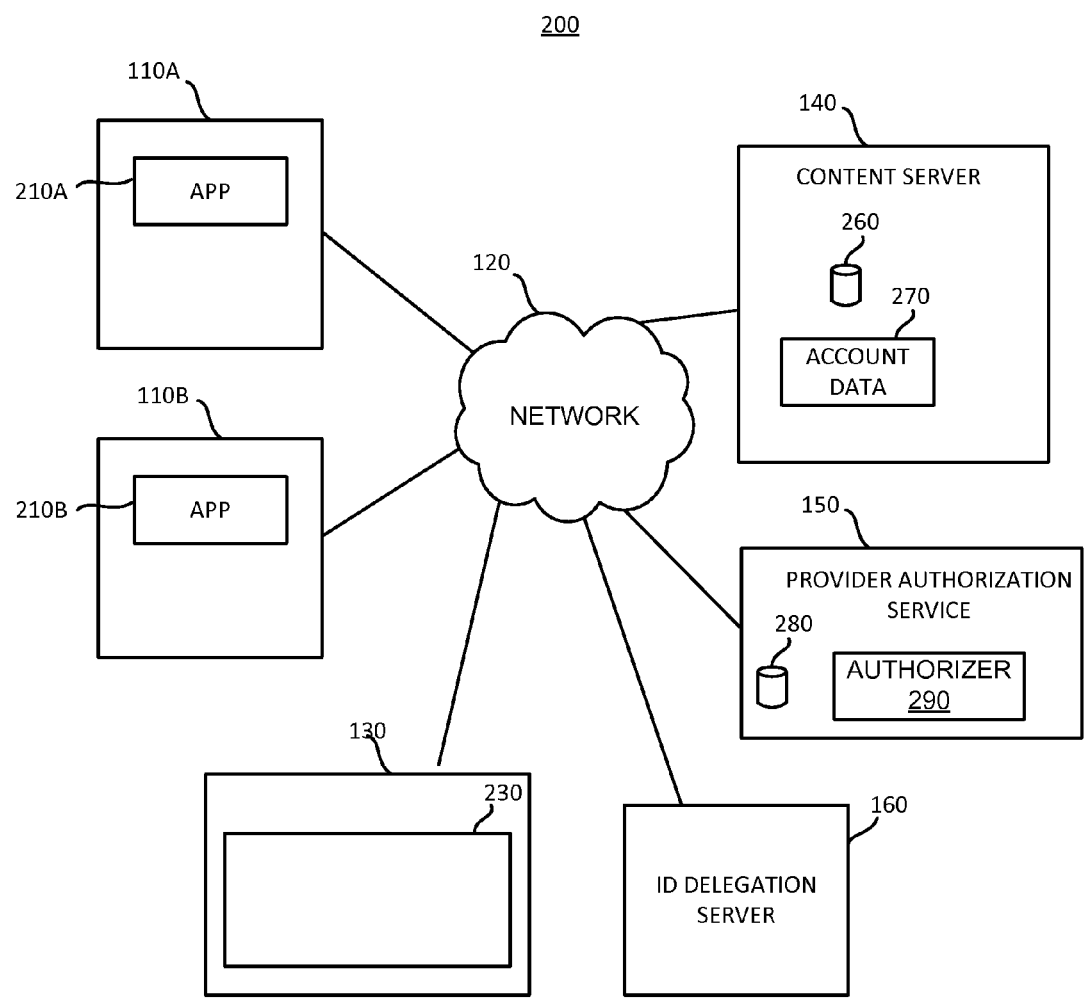
FIG. 2 is a block diagram of a system that can be used to provide identification delegation.

FIG. 2 is a block diagram of a system that can be used to provide identification delegation. As shown in FIG. 2, mobile devices 110A and 110B include applications 210A and 210B. As an illustrative example, application 210A may be a music streaming application and application 210B may be a video streaming application. Application 210A may require a user to enter a login or other user account credentials to listen to music.

Device 130 may be any kind of media player and may include an application 230. The application 230 may be an application downloaded from a web site or online store, which a user may implement to access content such as audio or video content (such as streaming music or movies, or games).

Content server 140 may include data store 260 and account data 270. Data store 260 may include various types of data, such as content provided to users (e.g., music or movies). Such content may be continually updated, for example based on user reviews, ratings, or preferences. Alternatively or additionally, such content may be stored remotely on one or more servers (not shown). Account data 270 includes user account data such as login or other access credentials. Some or all of account data 270 may, in some implementations, be included in data store 260 or may be located in a remote or peripheral storage (not shown).

Provider authorization service 150 may include data store 280 and authorizer 290. Data store 280 may include various tokens, which may be randomized. Authorizer 290 may operate to receive requests from mobile devices and other devices and to provide, in response to the requests, authorization codes or tokens, as described in more detail below with respect to FIG. 3. For example, provider authorization service 150 may validate a user authorization code and exchange the authorization code for an ephemeral token, which device 130 may use to request video data from content server 140.

System 200 may implement any number of combinations of mobile devices, devices, servers, data storage, etc., and the particular depiction of devices and servers shown in FIG. 2 are merely for illustration and may be modified. For example, content server 140 may use more than one data store 260, and account data 270 may be stored remotely at another server. As another example, provider authorization service 150 and content server 140 may be combined in a single server.

Figure 3:
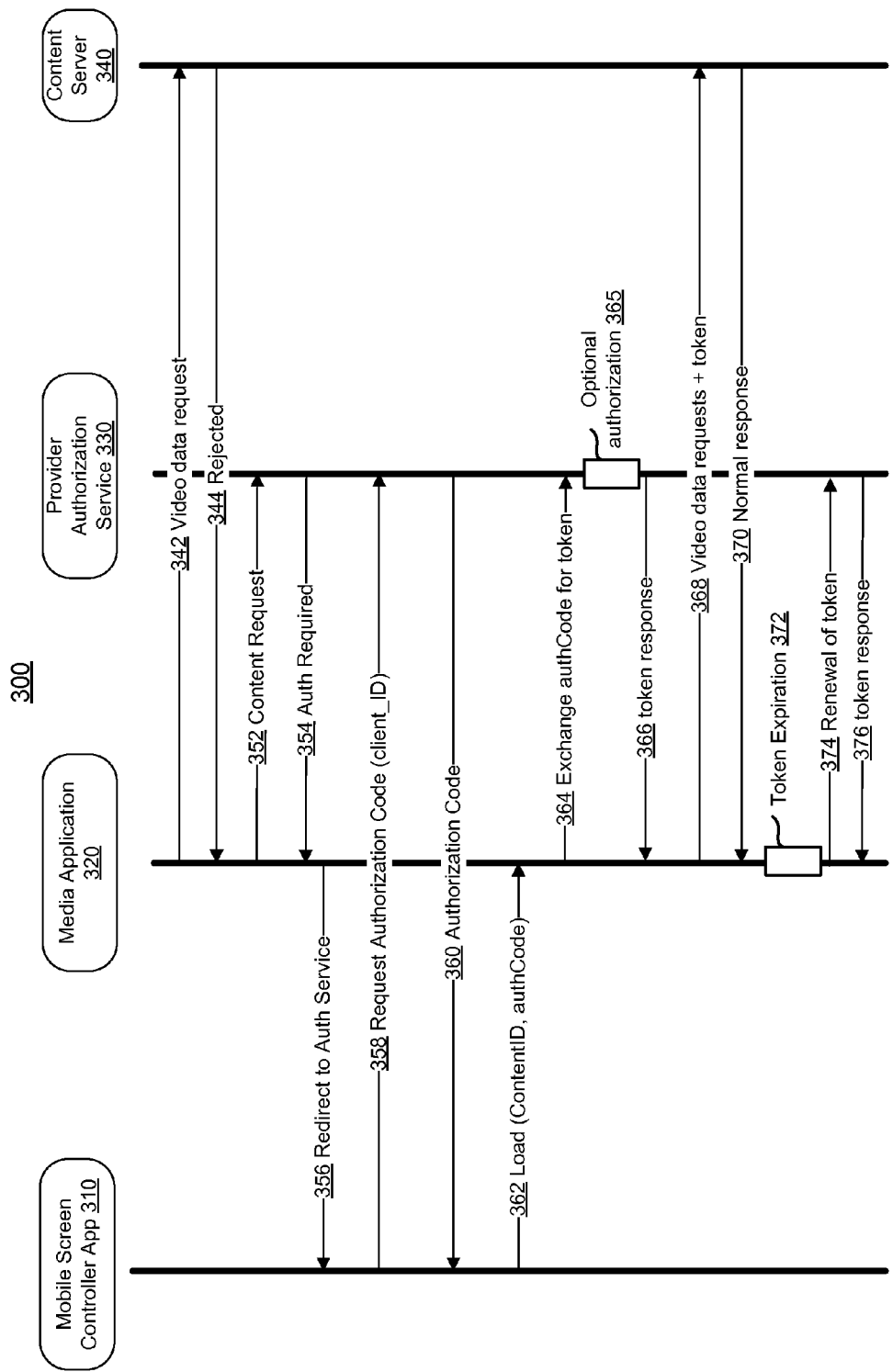
FIG. 3 is a sequence diagram illustrating an example of a system implementing identification delegation.

FIG. 3 is a sequence diagram illustrating an example of a system implementing identification delegation. The system may include a mobile screen controller application 310, a media application 320, a provider authorization service 330, and a content server 340. The mobile screen controller application 310 may be a video streaming application on a laptop or other mobile device. The application may, in various implementations, have been downloaded from a service or content provider web site or a mobile application store.

The media application 320 may be a media player application running on a media receiver device such as a television or a gaming device such as an XBOX, which can interact with a video streaming data service. In the illustrated embodiment, the black lines associated with each of the components of the system (e.g., mobile screen controller application 310, media application) represent the execution, by at least one microprocessor, of a process associated with that component. In the illustrated implementation, FIG. 3 shows the identification delegation and processing of a request for video data.

Action 342 illustrates that, in one implementation, a video data request is issued from the media application 320 to a content server 340. Action 344 illustrates that the video data request is rejected by the content server 340, which may occur for example because the requests lacks a token or other authentication element. In such an example, the content server 340 may send a message to the media application 320, and the sequence may continue to action 352 or, in some implementations, the sequence may proceed directly to action 356.

Action 352 illustrates that, in one implementation, a content request is issued from the media application 320 to a provider authorization service 330. Such a request may be sent by an application downloaded on (e.g., installed on) the media application 320 from a service or content provider web site.

Action 354 illustrates that the provider authorization service 330 notifies the media application 320 that authorization is required to proceed with the content request or with the session. In response to the notification, as illustrated by action 356, media application 320 requests of mobile screen controller application 310 that it redirect to the provider authorization service 330. As action 358 illustrates, the mobile screen controller application 310 requests an authorization code (for example by sending a client_ID) with a request to provider authorization service 330.

Action 360 illustrates that the provider authorization service 330 providers the authorization code to the mobile screen controller application 310. In various implementations, action 360 may include multiple steps (not shown) and may vary based on a content provider and mobile platform, for example.

Action 362 illustrates that the mobile screen controller application 310 may load a content identification (contentID) and the authorization code (authCode).

In various implementations, actions 364, 365, and 366 are optional. For example, the authorization code discussed above may be equivalent to (and used in place of) the token described below with respect to action 364, 365, and 366. Action 364 illustrates that media application 320 exchanges the authCode for a token from provider authorization service 330. Block 365 illustrates that, in some implementations, provider authorization service 330 may implement an optional authorization step to validate or authenticate a user using the authCode. For example, provider authorization service 330 may compare the authorization code to a database, or perform any validation process using the authorization code to ensure the authorization code is valid.

Action 366 illustrates that the provider authorization service 330 provides the token response to the media application. Action 368 illustrates that the media application 320 sends a video data request with the token to a content server 340. The content server 340 may, in some implementations, authorize the token with the provider authorization service 330. Action 370 illustrates that the content server 340 then provides a normal response to such a video data request.

Alternatively or additionally, the video data response may also be provided to the mobile screen controller application 310.

In some implementations, as illustrated by action 372, the token may expire, for example after a predetermined time, or in some implementations, after the provider authorization service 330 detects that the mobile screen controller application 310 is unavailable (e.g., is offline, is out of a predetermined range of the media application 320, is in a sleep mode, etc.). In such implementations, after the token expires, the media application 320 may no longer use an account associated with the token, for example to access other video content from content server 340. In some implementations, another round trip to the mobile screen controller application 310 may occur (not shown). The mobile screen controller application 310 in turn may send a request to the authorization service 330 (not shown) as in step 358, or the sequence may proceed to an action such as action 362.

As illustrated by action 374, the media application 320 may thereby implement a renewal of the token (which may be automatic) for example using a process to obtain an authorization code (which may be obtained from the mobile screen controller application 310 via another action such as action 362). Action 376 illustrates the token response from the provider authorization service. In such an implementation, the sequence may continue back to action 368 with the video data requests using the token.

In various implementations, the mobile screen controller application 310 may also terminate access of the media application 320 to the token or session, for example to ending access by the media application 320 to an account providing content on the content server 340.

Figure 4:
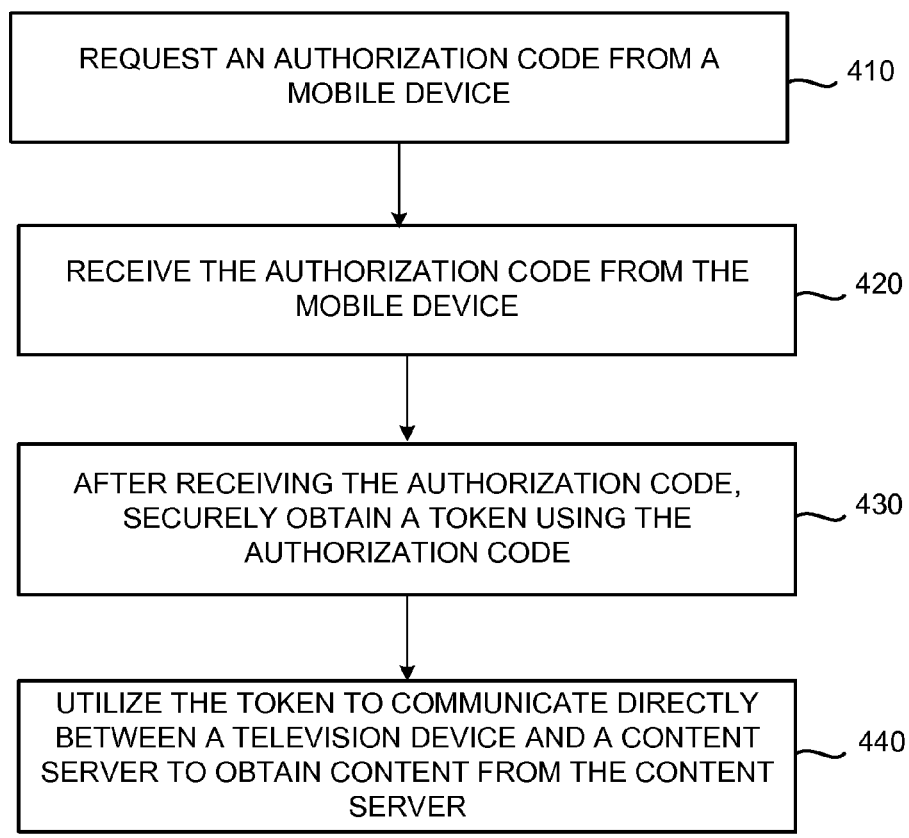
FIG. 4 is a flowchart of a process for providing identification delegation.

FIG. 4 is a flowchart of a process for providing identification delegation. The process illustrated in FIG. 4 may be performed at least in part by a computing device, for example, the media application 320 shown in FIG. 3 or the device 130 shown in FIG. 1. As shown in FIG. 4, a device may request an authorization code from a mobile device (410). The device may receive the authorization code from the mobile device (420). After receiving the authorization code, the device may (e.g., securely) obtain a token using the authorization code (430). The token may be a temporary token that expires after a predetermined time, or after a mobile device leaves a predetermined range. The device may obtain the token from a provider authorization service, such as provider authorization service 330 shown in FIG. 3.

The device may utilize the token to communicate (e.g., directly) between the device and a content server to obtain content from the content server (430). For example, the device may stream videos using the token, for example until the token expires (as described above with respect to FIG. 3, at which point the token may be renewed) or until the mobile device is unavailable (e.g., turned off, put in offline mode, sleep mode, etc.)

Figure 5:
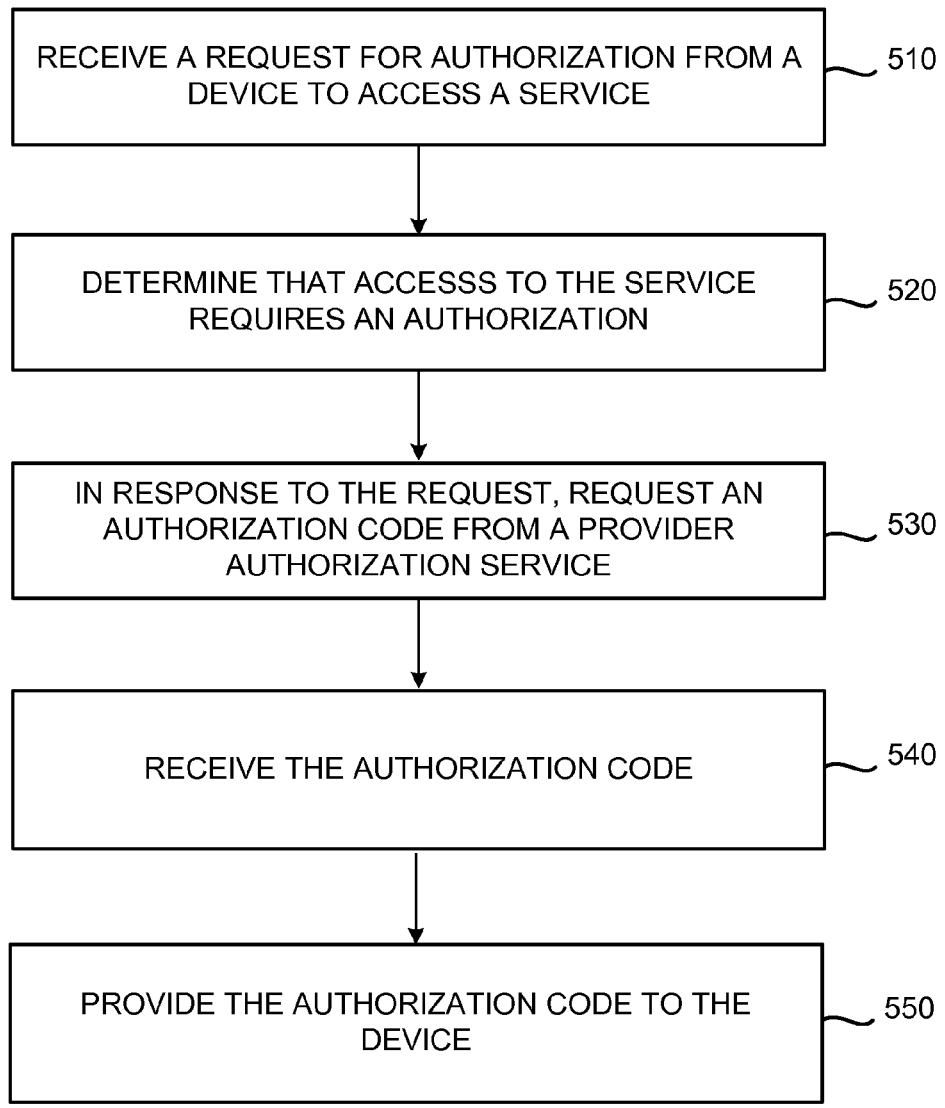
FIG. 5 is a flowchart of a process for authorizing identification delegation.

FIG. 5 is a flowchart of a process for authorizing identification delegation. The process illustrated in FIG. 5 may be performed at least in part by a computing system or device, for example the mobile devices 110A and 110B shown in FIG. 1 or a processor executing a mobile screen controller application 310 as described above with respect to FIG. 3. As shown in FIG. 5, the system may receive a request for authorization from a device to access a service (510). The device may be a television that is attempting to access a movie service. The system may determine that access to the service requires an authorization (520). For example, the system may receive a message from the movie service that an authorization is required to access movies. In response to the determination, the system may request an authorization code from a provider authorization service (530). The system may receive the authorization code (540) and in response to receiving the authorization code, the system may provide the authorization code to the device (550).

Figure 6:
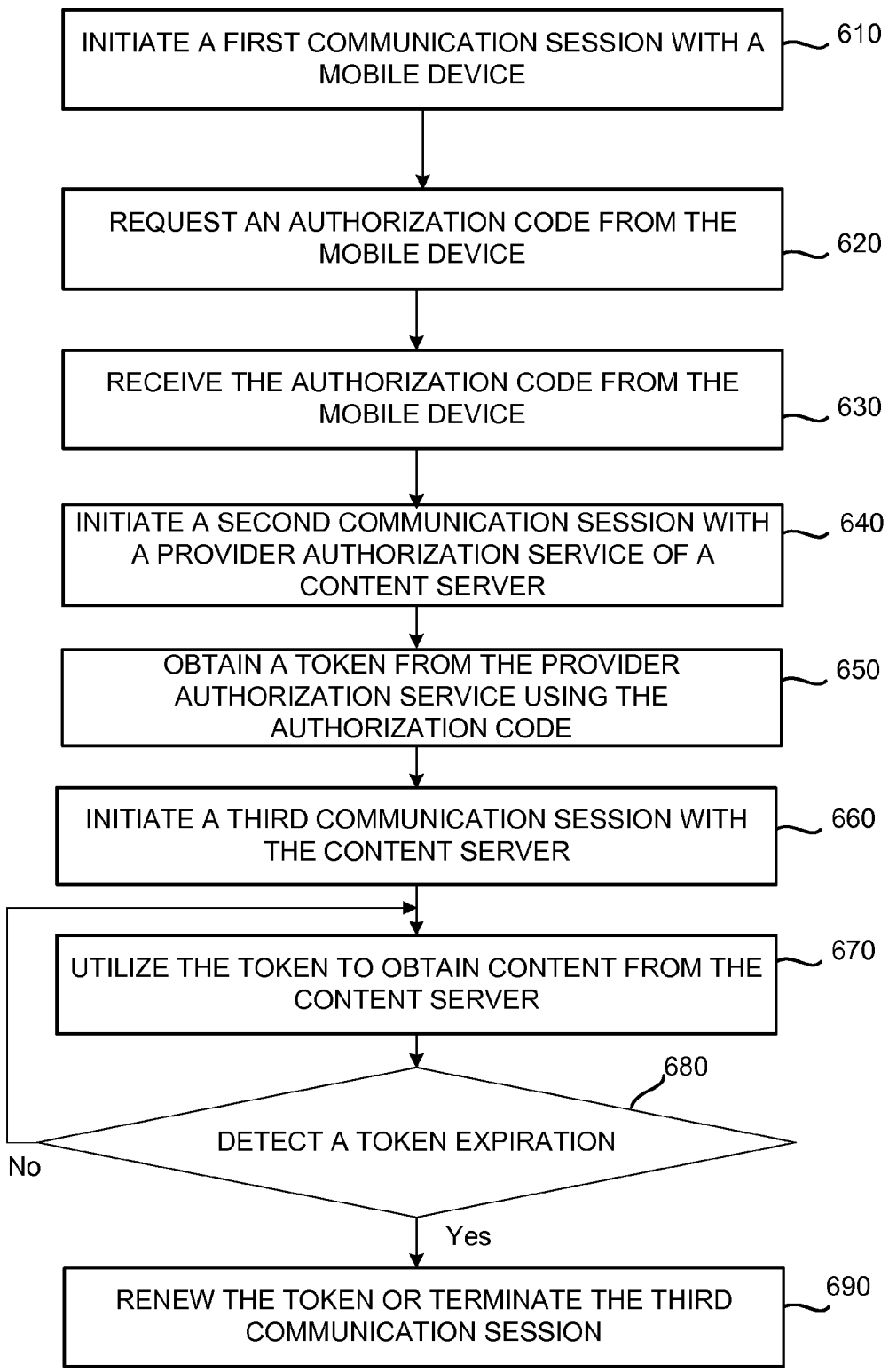
FIG. 6 is a flowchart of a process illustrating an implementation of identification delegation.

FIG. 6 is a flowchart of a process illustrating an implementation of identification delegation. The process shown in FIG. 6 may be performed at least in part by a computer system such as device 130 shown in FIGS. 1 and 2. The system may conduct a first communication session with a mobile device (610). Prior to the first communications session, the mobile device may have initiated communication with the system, and a handshake between the mobile device and the system may occur. The mobile device may be any computer device such as mobile devices 110A and 110B shown in FIG. 1. The system may initiate the first communication session, in some implementations, upon determining that the mobile device is within a predetermined range of the system. In some implementations, the system may receive a notification from a remote server that the mobile device is within a predetermined range of the system. The remote server may detect the mobile device based on GPS, WIFI, or other signals. The system may request an authorization code from the mobile device (620) and receive the authorization code from the mobile device (630) in response to the request. In some implementations, the system may use the authorization code to communicate directly with a content server.

In some implementations, the system may automatically initiate a second communication session with a provider authorization service of the content server (640), in response to receiving the authorization code. The provider authorization service may be the provider authorization service 150 shown in FIGS. 1 and 2 or the provider authorization service 330 shown in FIG. 3, for example. During the second communication session, the system may (e.g., securely) obtain a token from the provider authorization service using the authorization code (650). Examples of how the system obtains the token are described above with respect to FIG. 3.

The system may initiate a third communication session with the content server (660), for example in response to receiving the token. The system may utilize the token to obtain content from the content server (670). Examples of content include streaming media such as videos or audio. The system may determine if it detects a change a token expiration (680). If not (680, no), the system may continue to utilize the token to obtain content from the content server. If the system detects a token expiration (680, yes), the system may attempt to renew the token (for example, automatically, as described above with respect to FIG. 3, the system may communicate with the mobile device to initiate the acquisition of a new token, or the renewal of an existing one, and in response the mobile device may communicate with the authorization service or the mobile device may renew the token directly). Alternatively or additionally, the system may terminate the third communication session, for example if the automatic renewal process for the token fails (690). For example, if a user was watching a movie with a friend but the user has left the house and taken his phone with him, the system may determine that the mobile device is no longer within 100 feet of the system, and thus may terminate the third communication session for example via token expiration, so that unauthorized users (other people in the house, for example) can no longer have access to the user's account to watch movies. In various alternative or additional implementations, the system may terminate the third communication session various situations using token expiration, for example after a predetermined amount of time (e.g., minutes, hours), or in response to a user request to terminate the session (e.g., via the mobile device or via another device), or when a user manually shuts down the system or mobile device, or when the system detects another mobile device in a predetermined range of the system that is requesting access to the system or to other content.

Figure 7:
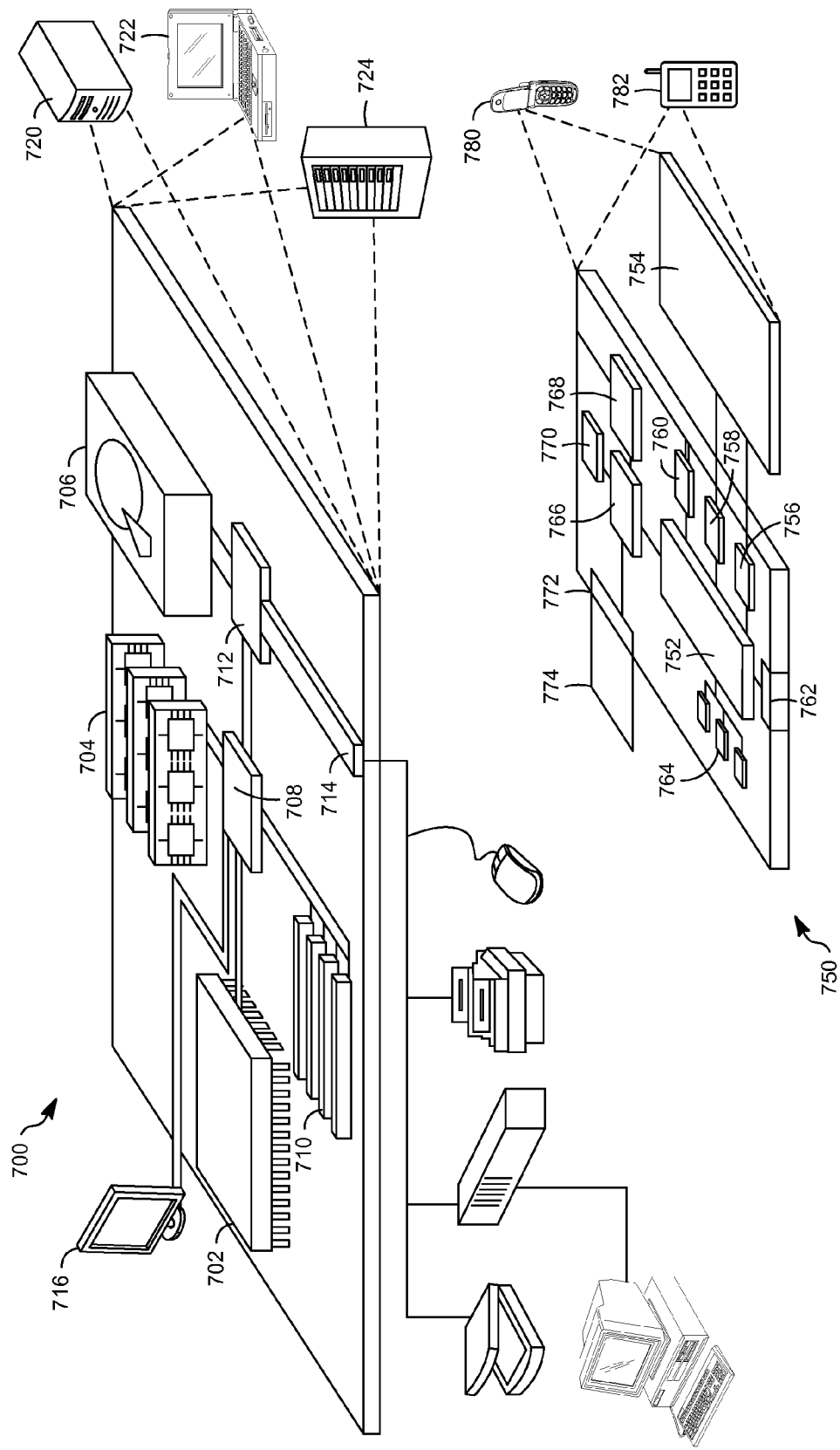
FIG. 7 illustrates an example of a computing device and a mobile computing device that can be used to implement the techniques described here.

FIG. 7 illustrates an example of a computing device and a mobile computing device that can be used to implement the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be examples only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. In some implementations, the memory includes a combination of volatile and non-volatile memory units, for example as described above with respect to FIG. 3. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is illustrative only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, BLUETOOTH, ETHERNET, wireless ETHERNET) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, which may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a BLUETOOTH, WIFI, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated from the described flows, and other components may be added to, or removed from, the described systems. Accordingly, other embodiments are within the scope of the following claims.

What is claimed is:

1. A method comprising:
conducting, by a media device, a first communication session between the media device and a mobile device detected within a set range of the media device, the first communication session including:
requesting, by the media device, an authorization code from the mobile device, the authorization code being provided by a provider authorization service to the mobile device in a user validation process based on credentials of a user of the mobile device, obtaining authentication from a content server, and
receiving, by the media device, the authorization code from the mobile device, the mobile device acting as an intermediary for obtaining the authentication from the content server, the content server configured to serve content including at least one of video and audio content, the media device being configured to use the served content, the mobile device and the media device being end user devices in a communications network;
initiating, by the media device, a second communication session with a provider authorization service of the content server, the second communication session including obtaining a token, by the media device, from the provider authorization service using the authorization code;
initiating, by the media device, a third communication session with the content server, the third communication session including utilizing the token to obtain, by the media device, content from the content server;
determining, by the media device, that the token has expired;
automatically attempting, by the media device, to renew the token in response to the expiration of the token when the token expires while the third communication session is active,
wherein, when the token expires and the third communication session is no longer active, the token remains expired and cannot be used by the media device during a future communication session to obtain content from the content server, access to the token being automatically terminated when the mobile device is offline, including:
automatically terminating, by the media device, access to the token when the mobile device is no longer detected within the set range of the media device, or a connection between the mobile device and the media device is terminated; and
automatically terminating, by the media device, the third communication session after a number of failed attempts to renew the token.

2. The method of claim 1, wherein the media device lacks a graphical user interface display area.

3. The method of claim 1, further comprising: terminating, by the media device, the third communication session in response to the expiration of the token.

4. The method of claim 3, wherein the terminating is performed without user input to the media device.

5. The method of claim 1, further comprising: requesting, by the mobile device, the authorization code from the provider authorization service.

6. The method of claim 1, further comprising: executing, on the media device, an application presenting content provided by the content server; and
while executing the application, sending, by the media device, a message to the mobile device.

7. The method of claim 1, wherein the content server is a remote server providing at least one of an audio service and a visual service.

8. The method of claim 1, wherein the token is obtained, by the media device, from the provider authorization service using the authorization code and a client identifier.

9. The method of claim 1, further comprising: sending, by the media device, a video data request with the token to the content server.

10. A system, including a media device, comprising:
at least one processor; and
a memory that stores instructions that, when executed by the at least one processor, cause the system to perform operations of: conducting, by the media device, a first communication session with a mobile device detected within a set range of the media device, the first communication session including:
requesting, by the media device, an authorization code from the mobile device, the authorization code being provided by a provider authorization service to the mobile device in a user validation process based on credentials of a user of the mobile device, and receiving, by the media device, the authorization code from the mobile device;

initiating, by the media device, a second communication session with a provider authorization service of a content server, the second communication session including obtaining, by the media device, a token from the provider authorization service using the authorization code, the content server configured to serve content including at least one of video and audio content, the media device being configured to use the served content, the mobile device and the media device being end user devices in a communications network;

initiating, by the media device, a third communication session with the content server, the third communication session including utilizing the token to obtain content, by the media device, from the content server;

determining, by the media device, that the token has expired;

automatically attempting, by the media device, to renew the token in response to the expiration of the token when the token expires while the third communication session is active, wherein, when the token expires and the third communication session is no longer active, the token remains expired and cannot be used by the media device during a future communication session to obtain content from the content server, access to the token being automatically terminated when the mobile device is offline, including:

automatically terminating, by the media device, access to the token when the mobile device is no longer detected within the set range of the media device, or a connection between the mobile device and the media device is terminated; and automatically terminating, by the media device, the third communication session after a number of failed attempts to renew the token.

11. The system of claim 10, wherein the operations further comprise: terminating, by the media device, the third communication session in response to the expiration of the token.

12. A non-transitory computer readable medium containing instructions that, when executed by a processor of a computing device configured as a media device, cause the computing device to: conduct, by the media device, a first communication session with a mobile device detected within a set range of the media device, the first communication session including:

requesting, by the media device, an authorization code from the mobile device, the authorization code being provided by a provider authorization service to the mobile device in a user validation process based on credentials of a user of the mobile device, and receiving, by the media device, the authorization code from the mobile device;

initiate, by the media device, a second communication session with a provider authorization service of a content server, the second communication session including obtaining, by the media device, a token from the provider authorization service using the authorization code, the content server configured to serve content including at least one of video and audio content, the media device being configured to use the served content, the mobile device and the media device being end user devices in a communications network;

initiate, by the media device, a third communication session with the content server, the third communication session including utilizing the token to obtain content, by the media device, from the content server;

attempt, by the media device, to renew the token in response to an expiration of the token when the token expires while the third communication session is active, wherein, when the token expires and the third communication session is no longer active, the token remains expired and cannot be used by the media device during a future communication session to obtain content from the content server, access to the token being automatically terminated when the mobile device is offline, including:

automatically terminating, by the media device, access to the token when the mobile device is no longer detected within the set range of the media device, or a connection between the mobile device and the media device is terminated; and automatically terminating, by the media device, the third communication session after a number of failed attempts to renew the token.

13. The non-transitory computer readable medium of claim 12, wherein the instructions further cause the computing device to: terminate the third communication session after a predetermined amount of time.

14. The non-transitory computer readable medium of claim 12, wherein the instructions further cause the computing device to: terminate the third communication session after the computing device receives a specific request from the mobile device to terminate the third communication session.

* * * * *